United States Patent
Minamikawa (10) Patent No.: US 8,066,616 B2
(45) Date of Patent: Nov. 29, 2011

(54) CONTROL APPARATUS FOR VEHICULAR AUTOMATIC TRANSMISSION

(75) Inventor: Koki Minamikawa, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 587 days.

(21) Appl. No.: 12/227,821

(22) PCT Filed: Jun. 27, 2008

(86) PCT No.: PCT/JP2008/061775
§ 371 (c)(1),
(2), (4) Date: Nov. 28, 2008

(87) PCT Pub. No.: WO2009/031355
PCT Pub. Date: Mar. 12, 2009

(65) Prior Publication Data
US 2009/0312142 A1    Dec. 17, 2009

(30) Foreign Application Priority Data

Sep. 7, 2007    (JP) .................................. 2007-233185

(51) Int. Cl.
*H02P 17/00*    (2006.01)
*B60W 10/00*    (2006.01)
(52) U.S. Cl. ...................... 477/15; 180/65.265; 903/945; 903/947; 477/94
(58) Field of Classification Search ...................... 477/15, 477/50, 97, 94, 95, 180; 180/65.265; 475/120, 475/127; 903/945, 947
See application file for complete search history.

(56) References Cited

U.S. PATENT DOCUMENTS

| | | | | |
|---|---|---|---|---|
| 5,833,570 A * | 11/1998 | Tabata et al. | ....................... | 477/3 |
| 5,951,614 A * | 9/1999 | Tabata et al. | ..................... | 701/54 |
| 2004/0192494 A1* | 9/2004 | Ozeki et al. | ......................... | 477/3 |
| 2007/0270277 A1* | 11/2007 | Ortmann et al. | ................... | 477/5 |
| 2008/0208422 A1* | 8/2008 | Shibata et al. | ................... | 701/54 |
| 2009/0149295 A1* | 6/2009 | Yamamoto et al. | ............ | 477/109 |

FOREIGN PATENT DOCUMENTS

| | | |
|---|---|---|
| JP | A-2000-118246 | 4/2000 |
| JP | A-2001-173768 | 6/2001 |
| JP | A-2004-140993 | 5/2004 |
| JP | A-2004-203219 | 7/2004 |
| JP | A-2004-204958 | 7/2004 |
| JP | A-2004-204960 | 7/2004 |

* cited by examiner

*Primary Examiner* — Tisha Lewis
(74) *Attorney, Agent, or Firm* — Oliff & Berridge, PLC (57) ABSTRACT

A control apparatus for a vehicular automatic transmission, which permits effective reduction of deterioration of vehicle drivability upon operation of a brake operating member, and which is configured to increase a sweeping rate in a sweep control of the torque capacity of a coupling element of an automatic transmission portion 20 to be engaged to perform a shifting action when a regenerative braking command is generated according to the operation of the brake operating member during an inertia phase of the shifting action, so that the coupling element is rapidly engaged for the purpose of generating an engine braking force when the regenerative braking command is generated according to the operation of the brake operating member during the inertia phase of the shifting action. Accordingly, the braking force generated during the shifting action is equal to the braking force generated in the normal state (in the absence of the shifting action).

5 Claims, 7 Drawing Sheets

|  | C1 | C2 | B1 | B2 | B3 | SPEED RATIO | STEPPING RATIO |
|---|---|---|---|---|---|---|---|
| 1st | ◯ |  |  |  | ◯ | 3.357 | 1.54 |
| 2nd | ◯ |  |  | ◯ |  | 2.180 | 1.53 |
| 3rd | ◯ |  | ◯ |  |  | 1.424 | 1.42 |
| 4th | ◯ | ◯ |  |  |  | 1.000 | SPREAD 3.36 |
| R |  | ◯ |  |  | ◯ | 3.209 | |
| N |  |  |  |  |  | | |

◯ ENGAGED

CONTROL APPARATUS FOR VEHICULAR AUTOMATIC TRANSMISSION

TECHNICAL FIELD

The present invention relates to a control apparatus for a vehicular automatic transmission, and more particularly to an improvement for reducing deterioration of vehicle drivability upon vehicle braking.

BACKGROUND ART

Field of the Invention

There is known a control apparatus for an automatic transmission of a vehicle having a transmission portion constituting a part of a power transmitting path between an engine and a drive wheel, and an electric motor operatively connected to an element of the transmission portion. Patent document 1 discloses an example of such a control apparatus for a hybrid drive system. This type of control apparatus is generally configured to implement a sweep control of a transmission upon a shifting action of the transmission, for reducing deterioration of drivability of the vehicle due to a shifting shock of the transmission. In the sweep control, the torque capacity of a coupling element of the transmission to be released to perform the shifting action is gradually reduced or that of a coupling element to be engaged to perform the shifting action is gradually increased.

Patent Document 1: JP-2004-204960A

Recently, more and more vehicles employ an electronic control brake (ECB). The electronic control brake is configured to calculate an optimum proportion of a braking force of a mechanical braking system including a disc brake or drum brake provided for each wheel, and a braking force of a regenerative braking system including an electric motor, depending upon an amount of operation of a brake pedal and according to a predetermined relationship between the optimum proportion and the amount of operation of the brake pedal. The brake for each wheel and the electric motor are controlled such that the braking forces of the mechanical and regenerative braking systems have the calculated optimum proportion. Also known is a vehicle which does not employ such an electronic control brake and which is arranged to add a predetermined amount of regenerative braking force generated by the electric motor, to a braking force generated by the mechanical braking system upon operation of a brake operating member, for the purpose of improving fuel economy of the vehicle.

DISCLOSURE OF THE INVENTION

Object Achieved by the Invention

However, the vehicle not employing the above-described electronic control brake and arranged to control the electric motor to generate the predetermined amount of regenerative braking force upon operation of the brake operating member has a risk of deterioration of its drivability due to a failure to produce a required total braking force if the brake pedal is operated during a shifting action of the transmission portion. This failure to normally produce the required total braking force (as produced when the shifting action is not performed) takes place depending upon the operating states of the coupling elements of the transmission portion associated with the shifting action. Thus, there has been a need of developing a control apparatus for a vehicular automatic transmission, which permits effective reduction of deterioration of the vehicle drivability upon operation of the brake operating member.

The present invention was made in view of the background art described above. It is therefore an object of this invention to provide a control apparatus for a vehicular automatic transmission, which permits effective reduction of deterioration of the vehicle drivability upon operation of the brake operating member.

Means for Achieving the Object

The object indicated above can be achieved according to the present invention, which provides a control apparatus for an automatic transmission of a vehicle having a transmission portion constituting a part of a power transmitting path between an engine and a drive wheel, and an electric motor operatively connected to an element of the transmission portion, the control apparatus being configured to generate a regenerative braking command commanding the electric motor to generate a predetermined regenerative braking force when a brake operating member is operated, and to implement a sweep control of a torque capacity of a coupling element of the transmission portion when the coupling element is engaged to perform a shifting action of the transmission portion, the control apparatus being characterized in that a sweeping rate in the sweep control of the torque capacity of the coupling element of the transmission portion to be engaged to perform the shifting action is increased when the regenerative braking command is generated during an inertia phase of the shifting action.

Advantage of the Invention

The vehicle including the automatic transmission for which the present control apparatus is provided has the transmission portion constituting a part of the power transmitting path between the engine and the drive wheel, and the electric motor operatively connected to an element of the transmission portion. The control apparatus is configured to generate the regenerative braking command commanding the electric motor to generate the predetermined regenerative braking force when the brake operating member is operated, and to implement the sweep control of the torque capacity of the coupling element of the transmission portion when the coupling element is engaged to perform a shifting action of the transmission portion. The control apparatus is further configured to increase the sweeping rate in the sweep control of the torque capacity of the coupling element of the transmission portion to be engaged to perform the shifting action, when the regenerative braking command is generated during the inertia phase of the shifting action, so that the coupling element is rapidly engaged for the purpose of generating an engine braking force when the regenerative braking command is generated according to the operation of the brake operating member during the inertia phase of the shifting action. Accordingly, the braking force generated during the shifting action is equal to the braking force generated in the normal state (in the absence of the shifting action). Namely, the present control apparatus for the vehicular automatic transmission permits effective reduction of deterioration of the vehicle drivability upon operation of the brake operating member.

Preferably, an amount of increase of the sweeping rate in the sweep control is determined such that a deceleration value of the vehicle corresponding to an amount of operation of the brake operating member during the shifting action of the transmission portion is equivalent to a deceleration value of the vehicle corresponding to the amount of operation of the brake operating member while the transmission portion is not in the shifting action. It is also preferable that an amount of increase of the sweeping rate in the sweep control is determined on the basis of an input torque of the transmission portion and according to a predetermined relationship between the amount of increase and the input torque. In this case, the deterioration of the vehicle drivability during the operation of the brake operating member can be effectively reduced.

It is also preferable that the sweeping rate is increased in the sweep control during a clutch-to-clutch shifting action of the transmission portion, which is performed by a releasing action of a coupling device of the transmission portion and an engaging action of the coupling device of the transmission portion to be engaged. In this case, the deterioration of the vehicle drivability upon operation of the brake operating member can be suitably reduced during the clutch-to-clutch shifting action in which the output torque of the transmission portion tends to be reduced. It is also preferable that the sweeping rate is increased in the sweep control during a coasting shift-down action of the transmission portion from a comparatively high gear position to a comparatively low gear position while an accelerator pedal is placed in a non-operated position. In this case, the deterioration of the vehicle drivability upon operation of the brake operating member can be suitably reduced during the coasting shift-down action in which the vehicle drivability tends to be deteriorated.

NOMENCLATURE OF ELEMENTS

8: Engine
20: Automatic transmission portion
34: Drive wheels
B1: First brake (coupling element)
B2: Second brake (coupling element)
B2: Third brake (coupling element)
C1: First clutch (coupling element)
C2: Second clutch (coupling element)
M2: Second electric motor
RE3: Third rotary element

BEST MODE FOR CARRYING OUT THE INVENTION

Referring to the drawings, a preferred embodiment of this invention will be described in detail.

Embodiment

Figure 1:
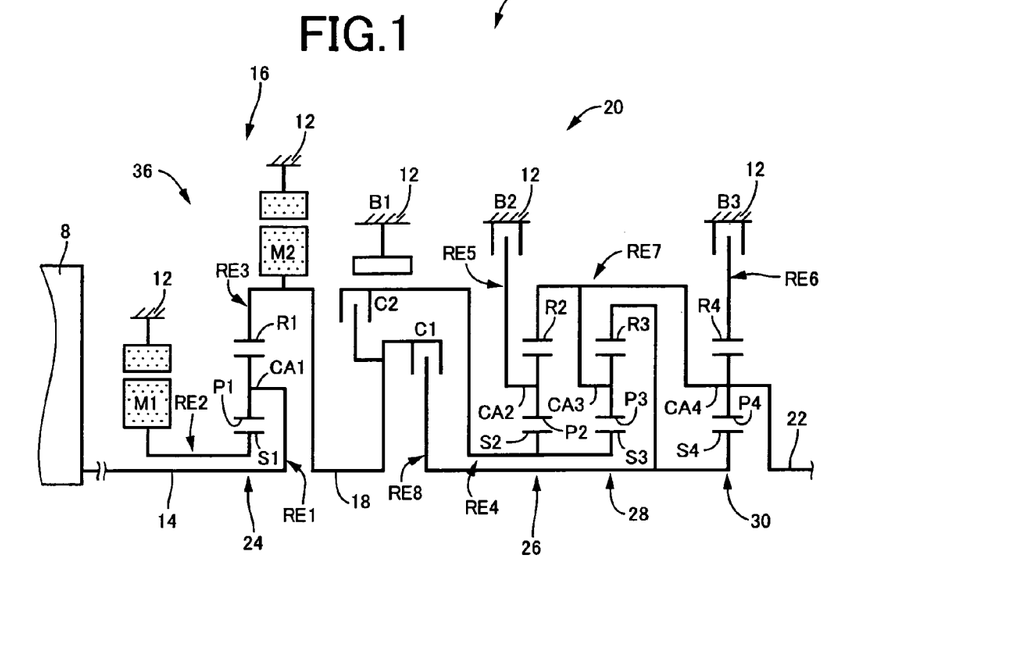
FIG. 1 is a schematic view showing an arrangement of a vehicular power transmitting system, to which a control apparatus of the present invention is applicable.

FIG. 1 is the schematic view showing the arrangement of a vehicular power transmitting system 10 to which the present invention is applicable. The power transmitting system 10 is longitudinally installed on an FR (front-engine rear-drive) vehicle, for example, and includes: an input shaft 14; a differential portion 16 connected to the input shaft 14 either directly, or indirectly via a pulsation absorbing damper (vibration damping device) not shown; an automatic transmission portion 20 disposed between the differential portion 16 and drive wheels 34 (shown in FIG. 6) and connected in series via a power transmitting member 18 (power transmitting shaft) to the differential portion 16; and an output shaft 22 connected to the automatic transmission portion 20. The input shaft 12, differential portion 16, automatic transmission portion 20 and output shaft 22 are coaxially disposed on a common axis in a transmission casing 12 (hereinafter referred to simply as "casing 12") functioning as a stationary member attached to a body of the vehicle, and are connected in series with each other. A drive force (rotary torque) produced by the differential portion 16 is transmitted to the automatic transmission portion 20 through the power transmitting member 18. Namely, the power transmitting member 18 functions as an output rotary element of the differential portion 16, and as an input rotary member of the automatic transmission portion 20.

The power transmitting system 10 described above is provided with a major drive power source in the form of an engine 8 having an output shaft (crankshaft) connected to the input shaft 14 either directly or via the pulsation absorbing damper (not shown). The engine 8 is an internal combustion engine such as a gasoline or diesel engine which is operated to produce a drive force by combustion of a fuel injected into cylinders. Between the engine 8 and the pair of drive wheels 34 (shown in FIG. 6), there is disposed a differential gear device (final reduction gear) 32 (shown in FIG. 6) which constitutes a part of the power transmitting path. The drive force produced by the engine 8 is transmitted to the pair of drive wheels 34 through the differential portion 16, automatic transmission portion 20, differential gear device 32 and a pair of axles. In the present power transmitting system 10, the engine 8 and the differential portion 16 are directly connected to each other. This direct connection means that the engine 8 and the transmission portion 16 are connected to each other, without a fluid-operated power transmitting device such as a torque converter or a fluid coupling being disposed therebetween, but may be connected to each other through the pulsation absorbing damper as described above. It is noted that a lower half of the power transmitting system 10, which is constructed symmetrically with respect to its axis, is omitted in FIG. 1.

The differential portion 16 described above is provided with a first electric motor M1, a second electric motor M2, and a first planetary gear set 24 of single-pinion type, and is configured to control a differential state between its input and output speeds by controlling an operating state of the first electric motor M1. The first electric motor M1 is connected to a rotary element in the form of a sun gear S1 (second rotary element RE2) of the first planetary gear set 24, while the second electric motor M2 is connected to a ring gear R1 (third rotary element RE3) of the first planetary gear set 24, which is rotated with the power transmitting member 18. In other words, the differential portion 16 is a mechanism configured to distribute an output of the first electric motor M1 and an output of the engine 8 received from the input shaft 14, and constitutes a differential mechanism in the form of a power distributing mechanism 36 configured to distribute the output of the engine 8 to the first electric motor M1 and the second electric motor M2. Each of the first and second electric motors M1 and M2 is a so-called motor/generator having a function of an electric motor operable to generate a mechanical drive force from an electric energy and a function of an electric generator operable to generate the electric energy from the mechanical drive force. However, the first electric motor M1 should function at least as an electric generator operable to generate a reaction force, while the second electric motor M2 should function at least as a drive power source in the form of an electric motor operable to produce a vehicle drive force. Namely, the second electric motor M2 functions as a drive power source (auxiliary drive power source) that operates in place of the main drive power source in the form of the engine 8, or together with the engine 8, for generating the vehicle drive power force.

The first planetary gear set 24 has a gear ratio ρ1 of about 0.418, and the power distributing mechanism 36 is principally constituted by the first planetary gear set 24. The first planetary gear set 24 has rotary elements consisting of the first sun gear S1, a first planetary gear P1; a first carrier CA1 supporting the first planetary gear P1 such that the first planetary gear P1 is rotatable about its axis and about the axis of the first sun gear S1; and the first ring gear R1 meshing with the first sun gear S1 through the first planetary gear P1. Where the numbers of teeth of the first sun gear S1 and the first ring gear R1 are represented by ZS1 and ZR1, respectively, the above-indicated gear ratio ρ1 is represented by ZS1/ZR1.

In the power distributing mechanism 36, the first carrier CA1 is connected to the input shaft 14, that is, to the engine 8, and the first sun gear S1 is connected to the first electric motor M1, while the first ring gear R1 is connected to the power transmitting member 18. The power distributing mechanism 36 constructed as described above is operated in a differential state in which three elements of the first planetary gear set 24 consisting of the first sun gear S1, first carrier CA1 and first ring gear R1 are rotatable relative to each other, so as to perform a differential function. In the differential state, the drive force generated by the engine 8 is distributed to the first electric motor M1 and the power transmitting member 18, whereby a portion of the output of the engine 8 is used to drive the first electric motor M1 to generate an electric energy which is stored or used to drive the second electric motor M2.

Thus, the differential portion 16 (power distributing mechanism 36) functions as an electric differential device, which is operable in a continuously-variable shifting state (electrically established CVT state) in which the rotating speed of the power transmitting member 18 is continuously variable, irrespective of the rotating speed of the engine 8, namely, placed in the differential state in which a speed ratio γ0 (rotating speed $N_{IN}$ of the input shaft 14/rotating speed $N_{18}$ of the power transmitting member 18) of the differential portion 16 is continuously changed from a minimum value γ0min to a maximum value γ0max, that is, in the continuously-variable shifting state in which the differential portion 16 functions as an electric differential portion functioning as an electrically controlled continuously-variable transmission the speed ratio γ0 of which is continuously variable from the minimum value γ0min to the maximum value γ0max.

The automatic transmission portion 20 is a multiple-step transmission of planetary gear type functioning as a step-variable automatic transmission which includes a single-pinion type second planetary gear set 26, a single-pinion type third planetary gear set 28 and a single-pinion type fourth planetary gear set 30. The second planetary gear set 26 has: a second sun gear S2; a second planetary gear P2; a second carrier CA2 supporting the second planetary gear P2 such that the second planetary gear P2 is rotatable about its axis and about the axis of the second sun gear S2; and a second ring gear R2 meshing with the second sun gear S2 through the second planetary gear P2. For example, the second planetary gear set 26 has a gear ratio ρ2 of about 0.562. The third planetary gear set 28 has: a third sun gear S3; a third planetary gear P3; a third carrier CA3 supporting the third planetary gear P3 such that the third planetary gear P3 is rotatable about its axis and about the axis of the third sun gear S3; and a third ring gear R3 meshing with the third sun gear S3 through the third planetary gear P3. For example, the third planetary gear set 28 has a gear ratio ρ3 of about 0.425. The fourth planetary gear set 30 has: a fourth sun gear S4; a fourth planetary gear P4; a fourth carrier CA4 supporting the fourth planetary gear P4 such that the fourth planetary gear P4 is rotatable about its axis and about the axis of the fourth sun gear S4; and a fourth ring gear R4 meshing with the fourth sun gear S4 through the fourth planetary gear P4. For example, the fourth planetary gear set 30 has a gear ratio ρ4 of about 0.421. Where the numbers of teeth of the second sun gear S2, second ring gear R2, third sun gear S3, third ring gear R3, fourth sun gear S4 and fourth ring gear R4 are represented by ZS2, ZR2, ZS3, ZR3, ZS4 and ZR4, respectively, the above-indicated gear ratios ρ2, ρ3 and ρ4 are represented by ZS2/ZR2. ZS3/ZR3, and ZS4/ZR4, respectively.

The automatic transmission portion 20 is provided with a plurality of coupling elements in the form of a first clutch C1, a second clutch C2, a first brake B1, a second brake B2 and a third brake B3 (hereinafter collectively referred to as "clutches C" and "brakes B", unless otherwise specified). These clutches C and brakes B are hydraulically operated frictional coupling devices used in a conventional vehicular automatic transmission. Each of these frictional coupling devices is constituted by a wet-type multiple-disc clutch including a plurality of friction plates which are forced against each other by a hydraulic actuator, or a band brake including a rotary drum and one band or two bands which is/are wound on the outer circumferential surface of the rotary drum and tightened at one end by a hydraulic actuator. Each of the clutches C and brakes B is selectively engaged for connecting two members between which each clutch or brake is interposed.

In the automatic transmission portion 20 constructed as described above, the second sun gear S2 and the third sun gear S3 are integrally fixed to each other as a unit, selectively connected to the power transmitting member 18 through the second clutch C2, and selectively fixed to the casing 12 through the first brake B1. The second carrier CA2 is selectively fixed to the casing 12 through the second brake B2, and the fourth ring gear R4 is selectively fixed to the casing 12 through the third brake B3. The second ring gear R2, third carrier CA3 and fourth carrier CA4 are integrally fixed to each other and fixed to the output shaft 22. The third ring gear R3 and the fourth sun gear S4 are integrally fixed to each other and selectively connected to the power transmitting member 18 through the first clutch C1.

Thus, the automatic transmission portion 20 and the differential portion 16 (power transmitting member 18) are selectively connected to each other through one of the first and second clutches C1, C2, which are provided to shift the automatic transmission portion 20. In other words, the first and second clutches C1, C2 function as coupling devices operable to switch a power transmitting path between the power distributing member 18 and the automatic transmission portion 18, to a selected one of a power transmitting state in which a vehicle drive force can be transmitted through the power transmitting path, and a power cut-off state in which the vehicle drive force cannot be transmitted through the power transmitting path. When at least one of the first and second clutches C1 and C2 is placed in the engaged state, the power transmitting path is placed in the power transmitting state. When both of the first and second clutches C1, C2 are placed in the released state, the power transmitting path is placed in the power cut-off state.

Figure 2:
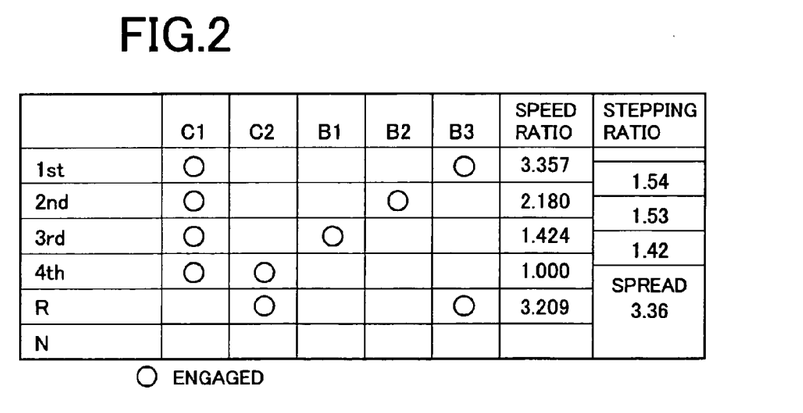
FIG. 2 is a table indicating operating states of hydraulically operated frictional coupling devices to establish a plurality of operating positions of an automatic transmission portion provided in the power transmitting system of FIG. 1.

The automatic transmission portion 20 is operable to perform a so-called "clutch-to-clutch" shifting action to establish a selected one of its gear positions by an engaging action of one of the coupling devices and a releasing action of another coupling device. The above-indicated operating gear have respective speed ratios γ (rotating speed $N_{IN}$ of the power transmitting member 18/rotating speed $N_{OUT}$ of the output shaft 22) which change as geometric series. As indicated in the table of FIG. 2, the first gear position having the highest speed ratio γ1 of about 3.357, for example, is established by engaging actions of the first clutch C1 and third brake B3, and the second gear position having the speed ratio γ2 of about 2.180, for example, which is lower than the speed ratio γ1, is established by engaging actions of the first clutch C1 and second brake B2. Further, the third gear position having the speed ratio γ3 of about 1.424, for example, which is lower than the speed ratio γ2, is established by engaging actions of the first clutch C1 and first brake B1, and the fourth gear position having the speed ratio γ4 of about 1.000, for example, which is lower than the speed ratio γ3, is established by engaging actions of the first clutch C1 and second clutch C2. The reverse gear position having the speed ratio γR of about 3.209, for example, which is intermediate between the speed ratios γ1 and γ2, is established by engaging actions of the second clutch C2 and the third brake B3, and the neutral position N is established when all of the first clutch C1, second clutch C2, first brake B1, second brake B2 and third brake B3 are placed in the released state.

In the power transmitting system 10 constructed as described above, the differential portion 16 functioning as the continuously-variable transmission and the automatic transmission portion 20 functioning as the step-variable transmission cooperate with each other to constitute a continuously-variable transmission. While the differential portion 16 is controlled to hold its speed ratio constant, the differential portion 16 and the automatic transmission portion 20 cooperate to constitute a step-variable transmission. When the differential portion 16 functions as the continuously-variable transmission while the automatic transmission portion 20 connected in series to the differential portion 16 functions as the step-variable transmission, the speed of the rotary motion transmitted to the automatic transmission portion 20 placed in a selected one of the gear positions M, namely, the rotating speed of the power transmitting member 18 is continuously changed, so that the speed ratio of the power transmitting system when the automatic transmission portion 20 is placed in the selected gear position M is continuously variable over a predetermined range. Accordingly, an overall speed ratio γT of the power transmitting system 10 (rotating speed $N_{IN}$ of the input shaft 14/rotating speed $N_{OUT}$ of the output shaft 22) is continuously variable. Thus, the power transmitting system 10 as a whole is operable as a continuously-variable transmission. The overall speed ratio γT is determined by the speed ratio γ0 of the differential portion 16 and the speed ratio γ of the automatic transmission portion 20.

For example, the rotating speed of the power transmitting member 18 is continuously variable over the predetermined range when the differential portion 16 functions as the continuously-variable transmission while the automatic transmission portion 20 is placed in a selected one of the first through fourth gear positions and reverse gear position as indicated in the table of FIG. 2. Accordingly, the overall speed ratio γT of the power transmitting system 10 is continuously variable across the adjacent gear positions. When the speed ratio of the differential portion 16 is held constant while the clutches C and brakes B are selectively engaged to establish the selected one of the first through fourth gear positions and the reverse gear position, the overall speed ratio γT of the power transmitting system 10 is variable in step as geometric series. Thus, the power transmitting system 10 is operable like a step-variable transmission. When the speed ratio γ0 of the differential portion 16 is held constant at 1, for example, the overall speed ratio γT of the power transmitting system 10 changes as the automatic transmission portion 20 is shifted from one of the first through fourth gear positions and reverse gear position to another, as indicated in the table of FIG. 2. When the speed ratio γ0 of the differential portion 16 is held constant at a value smaller than 1, for example, at about 0.7, while the automatic transmission portion 20 is placed in the fourth gear position, the overall speed ratio γT of the power transmitting system 10 is controlled to be about 0.7.

Figure 3:
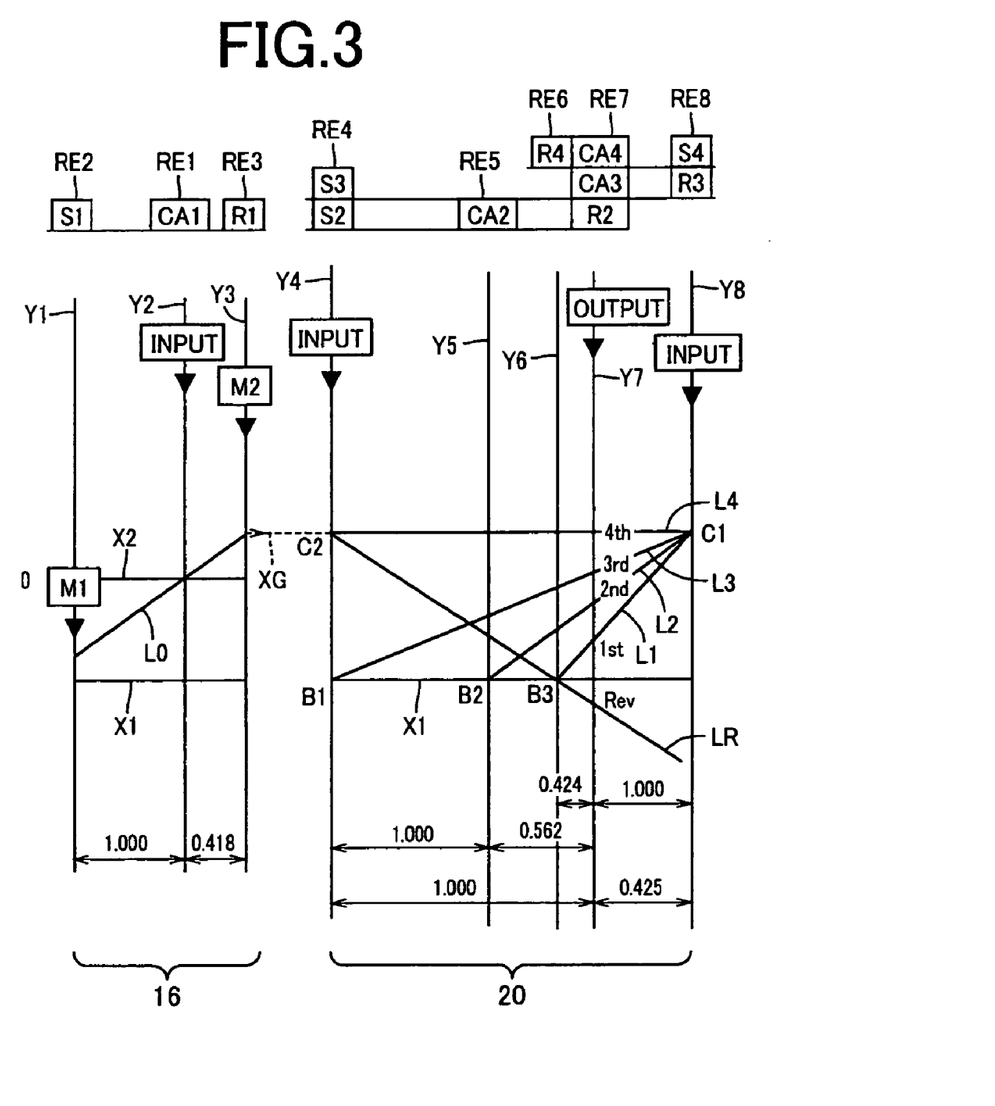
FIG. 3 is a collinear chart having straight lines indicating relative rotating speeds of rotary elements of a differential portion and the automatic transmission portion of the power transmitting system of FIG. 1, which rotary elements are placed in different states of mutual connection corresponding to the different gear positions.

The collinear chart of FIG. 3 indicates, by straight lines, a relationship among the rotating speeds of the rotary elements in each of the gear positions of the power transmitting system 10, which is constituted by the differential portion 16 and the automatic transmission portion 20. The different gear positions correspond to respective different states of connection of the rotary elements. The collinear chart of FIG. 3 is a rectangular two-dimensional coordinate system in which the gear ratios ρ of the planetary gear sets 24, 26, 28, 30 are taken along the horizontal axis, while the relative rotating speeds of the rotary elements are taken along the vertical axis. The horizontal line X1 indicates the rotating speed of 0, while the horizontal line X2 indicates the rotating speed of 1.0, that is, an operating speed $N_E$ of the engine 8 connected to the input shaft 14. The horizontal line XG indicates the rotating speed of the power transmitting member 18. Three vertical lines Y1, Y2 and Y3 corresponding to the three elements of the power distributing mechanism 36 of the differential portion 16 respectively represent the relative rotating speeds of the second rotary element (second element) RE2 in the form of the first sun gear S1, a first rotary element (first element) RE1 in the form of the first carrier CA1, and the third rotary element (third element) RE3 in the form of the first ring gear R1. The distances between the adjacent ones of the vertical lines Y1, Y2 and Y3 are determined by the gear ratio ρ1 of the first planetary gear set 24. Further, five vertical lines Y4, Y5, Y6, Y7 and Y8 corresponding to the transmission portion 20 respectively represent the relative rotating speeds of a fourth rotary element (fourth element) RE4 in the form of the second and third sun gears S2, S3 integrally fixed to each other, a fifth rotary element (fifth element) RE5 in the form of the second carrier CA2, a sixth rotary element (sixth element) RE6 in the form of the fourth ring gear R4, a seventh rotary element (seventh element) RE7 in the form of the second ring gear R2 and third and fourth carriers CA3, CA4 that are integrally fixed to each other, and an eighth rotary element (eighth element) RE8 in the form of the third ring gear R3 and fourth sun gear S4 integrally fixed to each other. The distances between the adjacent ones of the vertical lines are determined by the gear ratios ρ2, ρ3 and ρ4 of the second, third and fourth planetary gear sets 26, 28, 30. In the relationship among the vertical lines of the collinear chart, the distances between the sun gear and carrier of each planetary gear set corresponds to "1", while the distances between the carrier and ring gear of each planetary gear set corresponds to the gear ratio ρ. In the differential portion 16, the distance between the vertical lines Y1 and Y2 corresponds to "1", while the distance between the vertical lines Y2 and Y3 corresponds to the gear ratio ρ. In the automatic transmission portion 20, the distance between the sun gear and carrier of each of the second, third and fourth planetary gear sets 26, 28, 30 corresponds to "1", while the distance between the carrier and ring gear of each planetary gear set 26, 28, 30 corresponds to the gear ratio ρ.

Referring to the collinear chart of FIG. 3, the power distributing mechanism 36 (differential portion 16) of the power transmitting system 10 is arranged such that the first rotary element RE1 (first carrier CA1) of the first planetary gear set 24 is integrally fixed to the input shaft 14 (output shaft of the engine 8), and the second rotary element RE2 is fixed to the first electric motor M1, while the third rotary element RE3 (first ring gear R1) is fixed to the power transmitting member 18 and the second electric motor M2, so that a rotary motion of the input shaft 14 is transmitted (input) to the automatic transmission portion 20 through the power transmitting member 18. A relationship between the rotating speeds of the first sun gear S1 and the first ring gear R1 is represented by an inclined straight line L0 which passes a point of intersection between the lines Y2 and X2. In the differential state of the differential portion 16 in which the first through third rotary elements RE1-RE3 are rotatable relative to each other, for example, the rotating speed of the first sun gear S1, that is, the rotating speed of the first electric motor M1, which is represented by a point of intersection between the straight line L0 and the vertical line Y1, is raised or lowered by controlling the engine speed $N_E$, so that the rotating speed of the first carrier CA1 represented by a point of intersection between the straight line L0 and the vertical line Y2, if the rotating speed of the first ring gear R1 represented by a point of intersection between the straight line L0 and the vertical line Y3 is substantially held constant. When the rotating speed of the first electric motor M1 is controlled such that the speed ratio γ0 of the differential portion 16 is held at 1, so that the rotating speed of the first sun gear S1 is made equal to the engine speed $N_E$, the straight line L0 is aligned with the horizontal line X2, so that the first ring gear R1, that is, the power transmitting member 18 is rotated at the engine speed $N_E$. When the rotating speed of the first electric motor M1 is controlled such that the speed ratio γ0 of the differential portion 16 is held at a value lower than 1, for example at 0.7, on the other hand, so that the rotating speed of the first sun gear S1 is zeroed, the power transmitting member 18 is rotated at a speed $N_{18}$ higher than the engine speed $N_E$.

In the automatic transmission portion 20 indicated in the collinear chart of FIG. 3, the fourth rotary element RE4 is selectively connected to the power transmitting member 18 through the second clutch C2, and selectively fixed to the casing 12 through the first brake B1, and the fifth rotary element RE5 is selectively fixed to the casing 12 through the second brake B2, while the sixth rotary element RE6 is selectively fixed to the casing 12 through the third brake B3. The seventh rotary element RE7 is fixed to the output shaft 22, while the eighth rotary element RE8 is selectively connected to the power transmitting member 18 through the first clutch C1. The automatic transmission portion 20 is placed in the first gear position when the first clutch C1 and the third brake B3 are engaged in the state of the differential portion 16 in which a rotary motion of the differential portion 16 at a speed equal to the engine speed NE is input to the eighth rotary element RE8 of the automatic transmission portion 20. The rotating speed of the output shaft 22 in the first gear position ($1^{st}$) established by the engaging actions of the first clutch C1 and third brake B3 is represented by a point of intersection between the vertical line Y7 indicative of the rotating speed of the seventh rotary element RE7 fixed to the output shaft 22 and an inclined straight line L1 which passes a point of intersection between the vertical line Y8 indicative of the rotating speed of the eighth rotary element RE8 and the horizontal line X2, and a point of intersection between the vertical line Y6 indicative of the rotating speed of the sixth rotary element RE6 and the horizontal line X1, as indicated in FIG. 3, when the rotary motion of the speed equal to the engine speed $N_E$ is transmitted from the differential potion 16 to the eighth rotary element RE8, with the straight line L0 being aligned with the horizontal line X2. Similarly, the rotating speed of the output shaft 22 in the second gear position ($2^{nd}$) established by the engaging actions of the first clutch C1 and second brake B2 is represented by a point of intersection between an inclined straight line L2 determined by those engaging actions and the vertical line Y7 indicative of the rotating speed of the seventh rotary element RE7 fixed to the output shaft 22. The rotating speed of the output shaft 22 in the third gear position ($3^{rd}$) established by the engaging actions of the first clutch C1 and first brake B1 is represented by a point of intersection between an inclined straight line L3 determined by those engaging actions and the vertical line Y7 indicative of the rotating speed of the seventh rotary element RE7 fixed to the output shaft 22. The rotating speed of the output shaft 22 in the fourth gear position ($4^{th}$) established by the engaging actions of the first clutch C1 and second clutch C2 is represented by a point of intersection between a horizontal line L4 determined by those engaging actions and the vertical line Y7 indicative of the rotating speed of the seventh rotary element RE7 fixed to the output shaft 22.

Figure 4:
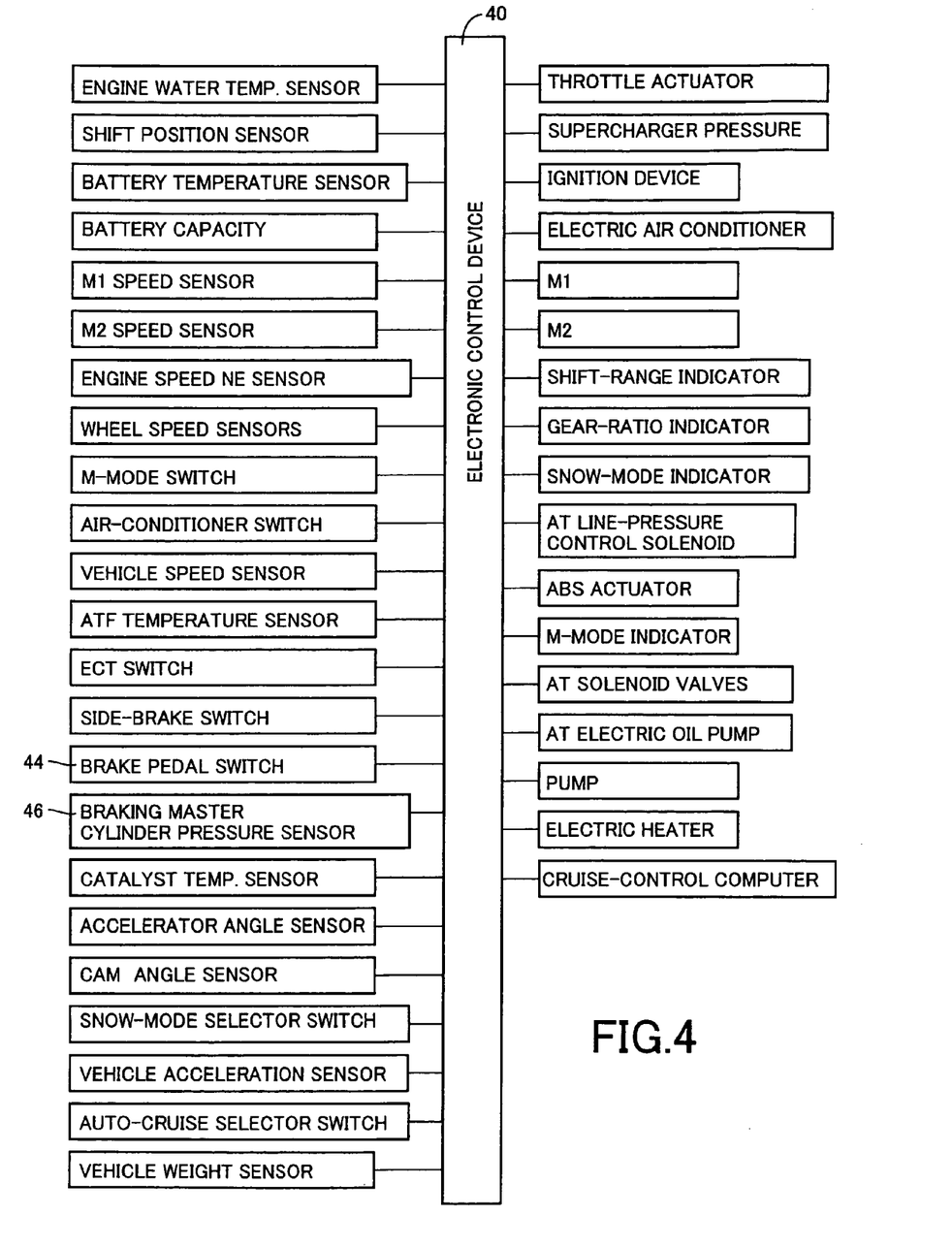
FIG. 4 is a view indicating input and output signals of an electronic control device provided for controlling the power transmitting system of FIG. 1.

FIG. 4 illustrates signals received by an electronic control device 40 provided to control the power transmitting system 10, and signals generated by the electronic control device 40. This electronic control device 40 includes a so-called microcomputer incorporating a CPU, a ROM, a RAM and an input/output interface, and is arranged to process the signals according to programs stored in the ROM while utilizing a temporary data storage function of the ROM, to implement various controls such as a drive control of the engine 8, hybrid drive controls of the engine 8 and first and second electric motors M1 and M2, and shifting controls of the automatic transmission portion 20.

The electronic control device 40 is arranged to receive from various sensors and switches shown in FIG. 4, various signals used in the power transmitting system 10, such as: a signal indicative of a temperature of cooling water of the engine 8; a signal indicative of a selected one of operating positions of a shift lever 52 (shown in FIG. 5); a signal indicative of the number of operations of the shift lever 52 from a manual forward-drive shifting position M; a signal indicative of a temperature of an electric-energy storage device 56 (shown in FIG. 6); a signal indicative of an electric energy amount (charging state) SOC of the electric-energy storage device 56; a signal indicative of an operating speed $N_{M1}$ of the first electric motor M1; a signal indicative of an operating speed $N_{M2}$ of the second electric motor M2; a signal indicative of the operating speed $N_E$ of the engine 8; signals indicative of the rotating speeds of the wheels; a signal indicative of an on-off state of an M mode (manual shifting mode) switch; a signal indicative of an operated state of an air conditioner; a signal indicative of the rotating speed $N_{OUT}$ of the output shaft 22, which corresponds to a running speed V of the vehicle; a signal indicative of a temperature of a working fluid ATF used by the automatic transmission portion 20; a signal indicative of an operated state of a side brake; a signal indicative of an operated state of a foot brake; a signal indicative of a pressure of a master cylinder of the foot brake; a signal indicative of a temperature of a catalyst; a signal indicative of a required amount of an output of the vehicle in the form of an amount of operation (an angle of operation) $A_{ACC}$ of an accelerator pedal; a signal indicative of an angle of a cam; a signal indicative of the selection of a snow drive mode; a signal indicative of a longitudinal acceleration value G of the vehicle; a signal indicative of the selection of an auto-cruising drive mode; and a signal indicative of a weight of the vehicle.

The electronic control device 40 is further arranged to generate various control signals for controlling the power transmitting system 10, such as: control signals to be applied to an engine output control device 58 (shown in FIG. 6) to control the output of the engine 8, such as a drive signal to drive a throttle actuator 64 for controlling an angle of opening $\theta_{TH}$ of an electronic throttle valve 62 disposed in an intake pipe 60 of the engine 8, a signal to control an amount of injection of a fuel by a fuel injecting device 66 into the intake pipe 60 or cylinders of the engine 8, a signal to be applied to an ignition device 68 to control the ignition timing of the engine 8, and a signal to adjust a supercharger pressure of the engine 8; a signal to operate the electric air conditioner; signals to operate the first and second electric motors M1 and M2; a signal to operate a shift-range indicator for indicating the selected operating or shift position of the shift lever 52; a signal to operate a gear-ratio indicator for indicating the gear ratio; a signal to operate a snow-mode indicator for indicating the selection of the snow drive mode; a signal to operate ABS actuators for wheel brakes so as to prevent slipping of the vehicle wheels; a signal to operate an M-mode indicator for indicating the selection of the M-mode; signals to operate solenoid-operated valves in the form of linear solenoid valves incorporated in a hydraulic control unit 38 (shown in FIG. 6) provided to control the hydraulic actuators of the hydraulically operated frictional coupling devices of the differential portion 16 and automatic transmission portion 20; a signal to operate a regulator valve incorporated in the hydraulic control unit 38, to regulate a line pressure $P_L$; a signal to control an electrically operated oil pump which is a hydraulic pressure source for generating a hydraulic pressure that is regulated to the line pressure PL; and a signal to drive an electric heater; a signal to be applied to a cruise-control computer; and a signal to activate an indicator for informing the operator that the output of the drive power source (hereinafter referred to as "drive power source output") is being restricted, for example, the engine output and/or the output of the second electric motor M2 (hereinafter referred to as "second electric motor output") is/are being restricted.

Figure 5:
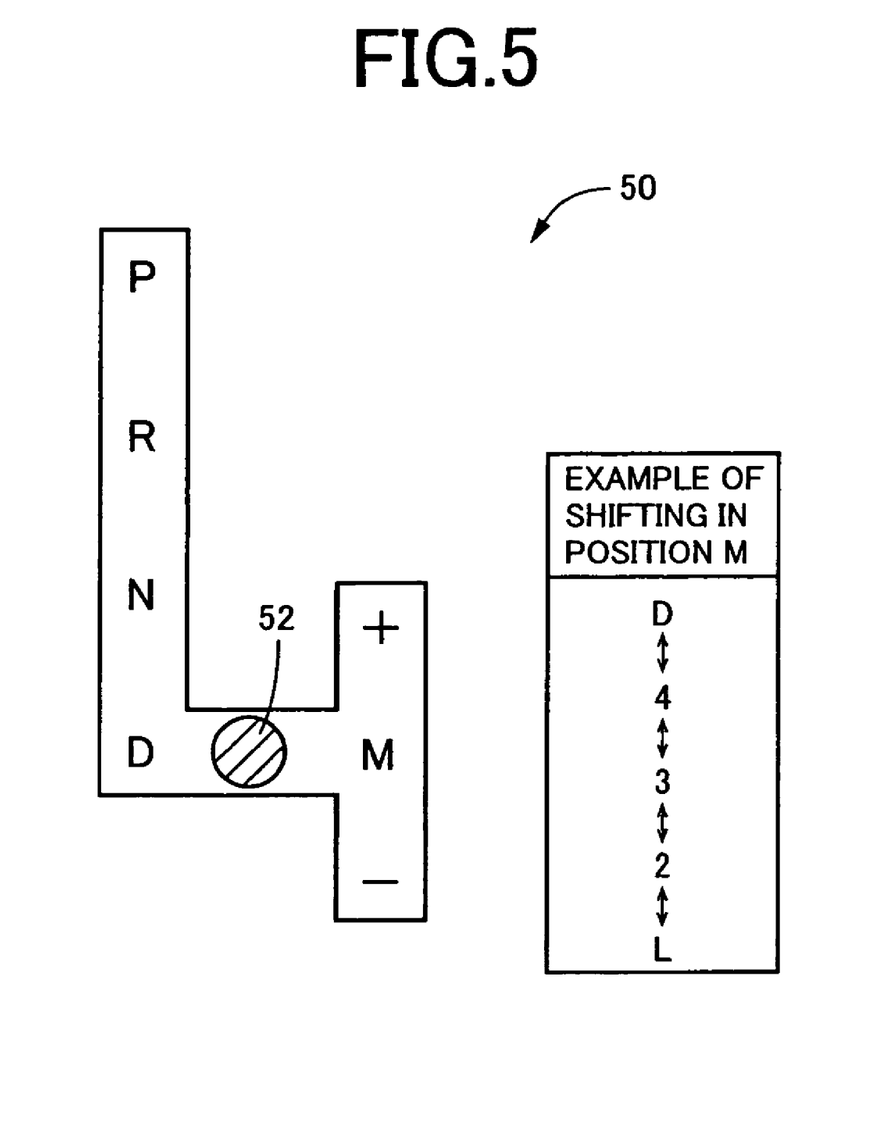
FIG. 5 is a view showing an example of a shifting device manually operated to selectively establish a plurality of shift positions of the power transmitting system of FIG. 1.

FIG. 5 is a view showing an example of a manually operable shifting device in the form of a shifting device 50 operable to select one of the plurality of shift positions $P_{SH}$ of the power transmitting system 10. The shifting device 50 includes the above-described shift lever 52, which is disposed laterally adjacent to an operator's seat of the vehicle, for example, and which is manually operated to select one of the plurality of shift positions $P_{SH}$. The shift positions $P_{SH}$ of the shift lever 52 consists of a parking position P for placing the power transmitting system 10 (automatic transmission portion 20) in a neutral state in which a power transmitting path through the automatic transmission portion 20 is disconnected while at the same time the output shaft 22 is placed in the locked state; a reverse-drive position R for driving the vehicle in the rearward direction; a neutral position N for placing the power transmitting system 10 in the neutral state; an automatic forward-drive shifting position D for establishing an automatic shifting mode; and the above-indicated manual forward-drive shifting position M for establishing a manual shifting mode. In the automatic shifting mode, the overall speed ratio γT is determined by the continuously variable speed ratio of the differential portion 16 and the speed ratio of the automatic transmission portion 20 which changes in steps as a result of an automatic shifting action of the automatic transmission portion 20 from one of the first through fourth gear positions to another. In the manual shifting mode, the number of the gear positions available is limited by disabling the automatic transmission portion 20 to be shifted to the relatively high gear position or positions.

As the shift lever 52 is operated to a selected one of the shift positions $P_{SH}$, the hydraulic control unit 38 is electrically operated to switch the hydraulic circuit to establish the rear-drive position R, neutral position N, and one of the forward-drive first through fourth gear positions, as indicated in the table of FIG. 2. The above-indicated parking position P and the neutral position N are non-drive positions selected when the vehicle is not driven, while the above-indicated reverse-drive position R, and the automatic and manual forward-drive positions D, M are drive positions selected when the vehicle is driven. In the non-drive positions P, N, the power transmitting path in the automatic transmission portion 20 is in the power-cut-off state established by releasing both of the clutches C1 and C2, as shown in the table of FIG. 2. In the drive positions R, D, M, the power transmitting path in the automatic transmission portion 20 is in the power-transmitting state established by engaging at least one of the clutches C1 and C2, as also shown in the table of FIG. 2.

Described in detail, a manual operation of the shift lever 52 of the shifting device 50 from the parking position P or neutral position N to the reverse-drive position R causes the second clutch C2 to be engaged for switching the power transmitting path in the automatic transmission portion 20 from the power-cut-off state to the power-transmitting state. A manual operation of the shift lever 52 from the neutral position N to the automatic forward-drive position D causes at least the first clutch C1 to be engaged for switching the power transmitting path in the automatic transmission portion 20 from the power-cut-off state to the power-transmitting state. A manual operation of the shift lever 52 from the rear-drive position R to the parking position P or neutral position N cause the second clutch C2 to be released for switching the power transmitting path in the automatic transmission portion 20 from the power-transmitting state to the power-cut-off state. A manual operation of the shift lever 52 from the automatic forward-drive position to the neutral position N causes the first clutch C1 and the second clutch C2 to be released for switching the power transmitting path from the power-transmitting state to the power-cut-off state.

Figure 6:
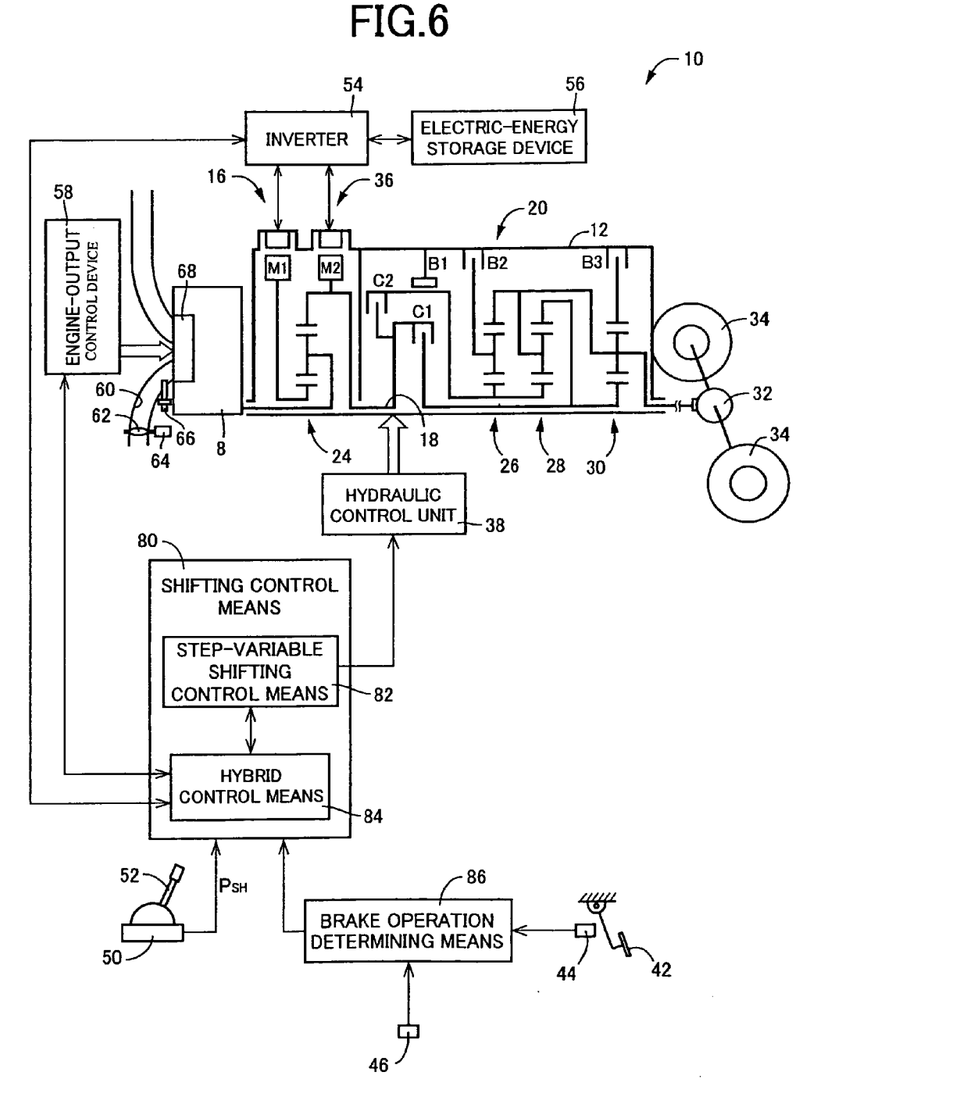
FIG. 6 is a functional block diagram illustrating major control functions of the electronic control device of FIG. 4.

FIG. 6 is the functional block diagram showing the major control functions of the electronic control device 40. Shifting control means 80 shown in FIG. 6 controls the speed ratio of the above-described power transmitting system 10 constituted by the differential portion 16 serving as the electrically controlled continuously-variable transmission and the automatic transmission portion 20 serving as the step-variable transmission. To this end, the shifting control means 80 includes step-variable shifting control means 82 for controlling the automatic transmission portion 20, and hybrid control means 84 for controlling the differential portion 16 through the engine 8, first electric motor, second electric motor M2, etc.

Figure 7:
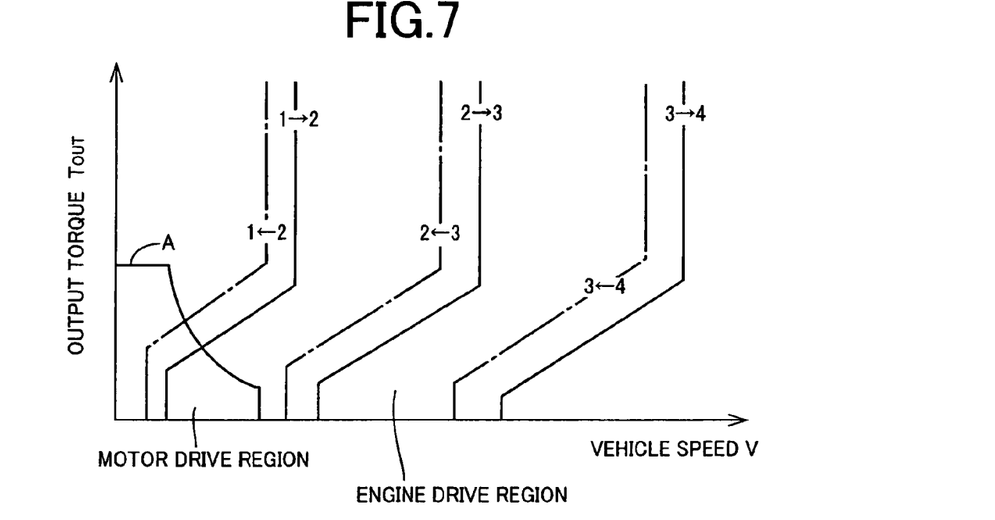
FIG. 7 is a view illustrating an example of stored shift-up and shift-down boundary lines for shifting the automatic transmission portion of the power transmitting system of FIG. 1, and an example of a stored map for switching between an engine drive mode and a motor-drive mode of the power transmitting system, which boundary lines and map are defined by a vehicle speed and an output torque of the automatic transmission portion.

The above-described step-variable shifting control portion 82 is configured to determine whether a shifting action of the automatic transmission portion 20 should take place, that is, to determine the gear position to which the automatic transmission portion 20 should be shifted. This determination is made on the basis of a condition of the vehicle represented by the actual vehicle speed V and the required output torque $T_{OUT}$ of the automatic transmission portion 20, and according to a stored relationship (shifting boundary line map) which represents shift-up boundary lines (indicated by solid lines in FIG. 7) and shift-down boundary lines (indicated by one-dot chain lines in FIG. 7), which are defined by the vehicle speed V and the output torque $T_{OUT}$ of the automatic transmission portion 20, as indicated in FIG. 7 by way of example. Described in detail, the step-variable shifting control portion 82 generates a shifting command (hydraulic control command) to be applied to the hydraulic control unit 38, to engage and/or release the appropriate hydraulically operated frictional coupling devices for establishing the determined gear position of the automatic transmission portion 20 according to the table of FIG. 2. In other words, the step-variable shifting control portion 82 commands the hydraulic control unit 38 to perform the clutch-to-clutch shifting action of the automatic transmission portion 20, by releasing and engaging the respective two frictional coupling devices. According toe generated shifting command, the hydraulic control unit 38 controls the linear solenoid valves SL for activating the appropriate hydraulic actuators of the appropriate two frictional coupling devices to concurrently engage one of the two frictional coupling devices and release the other frictional coupling device, to effect the shifting action of the automatic transmission portion 20.

The step-variable shifting control means 82 is preferably configured to implement sweep controls of the torque capacities of the coupling elements associated with a shifting action of the automatic transmission portion 20. In this sweep control, the torque capacities are changed at predetermined rates. That is, a releasing sweep control is implemented such that the torque capacity of the coupling element to be released to perform a clutch-to-clutch shifting action of the automatic transmission portion 20 is reduced (gradually reduced) at a predetermined rate, while at the same time an engaging sweep control is implemented such that the torque capacity of the coupling element to be engaged to perform the clutch-to-clutch shifting action is increased (gradually increased) at a predetermined rate. Described in detail, the hydraulic pressure corresponding to the hydraulically operated frictional coupling device to be released to perform the shifting action of the automatic transmission portion 20 is gradually reduced at a predetermined rate (preferably represented by a linear function) while the hydraulic pressure corresponding to the hydraulically operated frictional coupling device to be engaged to perform the shifting action is gradually increased at a predetermined rate (preferably represented by a linear function).

The hybrid control means 84 serves as differential-portion control means for controlling the operation of the differential portion 16, and is arranged to control the engine 8 to be operated with high efficiency, and to control the first and second electric motors M1, M2 so as to optimize a proportion of drive forces generated by the engine 8 and the second electric motor M2, and a reaction force generated by the first electric motor M1, for thereby controlling the speed ratio γ0 of the differential portion 16 operating as the electrically controlled continuously-variable transmission. For instance, the hybrid control means 84 calculates a target (required) vehicle output at the present running speed V of the vehicle, on the basis of the operation amount $A_{CC}$ of the accelerator pedal used as an operator's required vehicle output and the vehicle running speed V, and calculates. a target total vehicle output on the basis of the calculated target vehicle output and a required amount of generation of an electric energy by the first electric motor M1. The hybrid control means 84 calculates a target output of the engine 8 to obtain the calculated target total vehicle output, while taking account of a power transmission loss, a load acting on various devices of the vehicle, an assisting torque generated by the second electric motor M2, etc. The hybrid control means 84 controls the speed $N_E$ and torque $T_E$ of the engine 8, so as to obtain the calculated target engine output, and the amount of generation of the electric energy by the first electric motor M1.

As described above, the overall speed ratio γT of the power transmitting system 10 as a whole is determined by the speed ratio γ of the automatic transmission portion 20 controlled by the step-variable shifting control means 82 and the speed ratio γ0 of the differential portion 16 controlled by the hybrid control means 84. Namely, the shifting control means 80 controls the overall speed ratio γT of the power transmitting system 10 as a whole through the step-variable shifting control means 82 and the hybrid control means 84, within a range of the gear positions available in the selected shift position $P_{SH}$ of the manually operated shift leer 52 represented by the output signal $P_{SH}$ of the shifting device 50.

The hybrid control means 84 described above is arranged to implement the hybrid shifting control, so as to improve the driving characteristics and fuel economy of the power transmitting system 10. In the hybrid shifting control, the differential portion 16 is controlled to function as the electrically controlled continuously-variable transmission, for optimum coordination of the engine speed $N_E$ for its efficient operation, and the rotating speed of the power transmitting member 18 determined by the vehicle speed V and the selected gear position of the automatic transmission portion 20. In other words, the hybrid control portion 82 determines a target value of the overall speed ratio γT of the power transmitting system 10, so that the engine 8 is operated according to a stored highest-fuel-economy curve. The target value of the overall speed ratio γT of the power transmitting system 10 permits the engine torque $T_E$ and speed $N_E$ to be controlled so that the engine 8 provides an output necessary for obtaining the target vehicle output. The highest-fuel-economy curve is obtained by experimentation so as to satisfy both of the desired operating efficiency and the highest fuel economy of the engine 8, and is defined in a two-dimensional coordinate system defined by an axis of the engine speed $N_E$ and an axis of the engine torque $T_E$. The hybrid control portion 82 controls the speed ratio γ0 of the differential portion 16, while taking account of the selected gear position of the automatic transmission portion 20, so as to obtain the target value of the overall speed ratio γT, so that the overall speed ratio γT can be continuously changed within a predetermined range.

In the hybrid control, the hybrid control means 84 controls an inverter 54 such that the electric energy generated by the first electric motor M1 is supplied to an electric-energy storage device 56 and the second electric motor M2 through the inverter 54. That is, a major portion of the drive force produced by the engine 8 is mechanically transmitted to the power transmitting member 18, while the remaining portion of the drive force is consumed by the first electric motor M1 to convert this portion into the electric energy, which is supplied through the inverter 54 to the second electric motor M2, so that the second electric motor M2 is operated with the supplied electric energy, to produce a mechanical energy to be transmitted to the power transmitting member 18. The components associated with the generation of an electric energy and the consumption of the electric energy by the second electric motor M2 define an electric path through which a portion of the drive force of the engine 8 is converted into an electric energy and through which the electric energy is converted into a mechanical energy. The overall speed ratio γT of the power transmitting system 10 is changed in steps due to a stepping change of the speed ratio of the automatic transmission portion 20, in particular, which takes place as a result of a shifting action of the automatic transmission portion 20 performed under the control of the step-variable shifting control means 82

According to the controls described above, the vehicle drive torque can be changed more rapidly when the overall speed ratio γT is changed in steps or in a stepping fashion, than when the overall speed ratio γT is changed continuously. On the other hand, the stepping change of the overall speed ratio γT may cause generation of a shifting shock, or deterioration of the fuel economy due to a failure to control the engine speed NE along the highest-fuel-economy curve. In view of this drawback, the hybrid control means 84 is configured to control the speed ratio of the differential portion 16 in synchronization with a shifting action of the automatic transmission portion 20 such that the speed ratio of the differential portion 16 changes in a direction opposite to the direction of change of the speed ratio of the automatic transmission portion 20, for reducing an amount of stepping change of the overall speed ratio γT. In other words, the hybrid control means 84 controls the speed ratio of the differential portion 16 in synchronization with the shifting action of the automatic transmission portion 20, so that the overall speed ratio γT of the power transmitting system 10 is continuously changed during the shifting action of the automatic transmission portion 20. For example, the hybrid control means 84 controls the shifting action of the differential portion 16 in synchronization with the shifting action of the automatic transmission portion 20 such that the speed ratio of the differential portion 16 changes in steps in the direction opposite to the direction of stepping change of the speed ratio of the automatic transmission portion 20, so as to prevent a transient change of the overall speed ratio γT of the power transmitting system 10 during a period of the stepping change of the speed ratio of the automatic transmission portion 20.

The hybrid control means 84 is further configured to control the operating speed of the engine 8 through the first electric motor M1, for instance, to hold the engine speed $N_E$ substantially constant or at a desired value, by controlling the operating speed $N_{M1}$ of the first electric motor M1 through the electric CVT function of the differential portion 16, irrespective of whether the vehicle is stationary or running. For example, the hybrid control means 84 raises the engine speed $N_E$ by raising the operating speed $N_{M1}$ of the first electric motor M1 during running of the vehicle while the operating speed $N_{M2}$ of the second electric motor M1 determined by the vehicle running speed V (rotating speed of the drive wheels 34) is held substantially constant, as is apparent from the collinear chart of FIG. 3.

The hybrid control means 84 is further configured to command the above-described engine-output control device 58 to control the engine 8 so as to provide the required output, by controlling the throttle actuator 64 to open and close the electronic throttle valve 62, and controlling an amount and time of fuel injection by the fuel injecting device 66 into the engine 8, and/or the timing of ignition of the igniter by the ignition device 68, alone or in combination. For instance, the hybrid control means 84 is basically arranged to control the throttle actuator 64 on the basis of the operation amount $A_{CC}$ of the accelerator pedal and according to a predetermined stored relationship (not shown) between the operation amount $A_{CC}$ and the opening angle $θ_{TH}$ of the electronic throttle valve 62 such that the opening angle $θ_{TH}$ increases with an increase of the operation amount $A_{CC}$. The engine output control device 58 controls the engine torque according to the commands received from the hybrid control means 84, by controlling the throttle actuator 64 to open and close the electronic throttle valve 62, controlling the fuel injecting device 66 to control the fuel injection, and controlling the ignition device 68 to control the ignition timing of the igniter.

The above-described hybrid control. means 84 is capable of establishing a motor-drive mode to drive the vehicle by the electric motor, by utilizing the electric CVT function (differential function) of the differential portion 16, irrespective of whether the engine 8 is in the non-operated state or in the idling state. For instance, the hybrid control means 84 determines whether the vehicle condition represented by the actual vehicle speed V and the required output torque $T_{OUT}$ of the automatic transmission portion 20 lies in a motor-drive region or an engine-drive region, and establish the motor-drive region or engine-drive region on the basis of a result of the determination. The motor-drive region and engine-drive region are defined by a boundary line represented by a stored relationship (drive-power-source switching map) between the vehicle speed V and the output torque $T_{OUT}$ of the automatic transmission portion 20, which relationship is indicated in FIG. 7 by way of example. The engine 8 us used as the drive power source when the vehicle condition lies in the engine-drive region, while the second electric motor M2 is used as the drive power source when the vehicle condition lies in the motor-drive region. The drive-power-source switching map indicated by solid line A in FIG. 7 is stored in memory together with the shifting map indicated by solid lines and one-dot chain lines in FIG. 7. As is apparent from FIG. 7, the hybrid control means 84 establishes the motor-drive mode when the operating efficiency of the engine 8 is comparatively low, that is, when the output torque $T_{OUT}$ or engine torque $T_E$ is comparatively low or when the vehicle is running at a comparatively low speed V or in a comparatively low load state.

For reducing a dragging of the engine 8 in its non-operated state and improving the fuel economy in the motor-drive mode, the hybrid control means 84 is configured to hold the engine speed $N_E$ at zero or substantially zero as needed, by controlling the differential portion 16 to perform its electric CVT function (differential function) such that the first electric motor M1 $N_{M1}$ is operated in a non-load state so as to be freely rotated at a negative speed $N_{M1}$. The hybrid control means 84 is further capable of performing a so-called "torque assisting operation" to assist the engine 8, even in the engine-drive region of the vehicle condition, by supplying an electric energy from the first electric motor M1 or the electric-energy storage device 60 to the second electric motor M2 through the above-described electric path, so that the second electric motor M2 is operated to transmit a drive torque to the drive wheels 34. The hybrid control means 84 is further configured to place the first electric motor M1 in a non-load state in which the first electric motor M1 is freely rotated, so that the differential portion 16 is placed in a state similar to the power cut-off state in which power cannot be transmitted through the power transmitting path within the differential portion 16, and no output can be generated from the differential portion 16. Namely, the hybrid control means 84 is configured to place the first electric motor M1 in the non-load state, for thereby placing the differential portion 16 in a neutral state in which the power transmitting path is electrically cut off.

As described above, the motor-drive region defined by the drive-power-source switching map indicated in FIG. 7 is generally determined so that the motor-drive mode is established when the engine operating efficiency is comparatively low, that is, when the output torque $T_{OUT}$ is comparatively low or when the vehicle is running at a comparatively low speed V or in a comparatively low load state. Further, the vehicle is driven by the second electric motor M2 rather than the engine 8, when the rear-drive position R is selected, that is, when the vehicle is run in the reverse direction at a comparatively low speed. This aspect is not indicated in FIG. 7. Thus, the vehicle is driven by the motor rather than the engine when the shift lever 52 is operated from the position N to the position D or position R, namely, when the shift leer 52 is subjected to a garage shifting action (a shifting action from the position N to the position D, a shifting action from the position N to the position R, or a shifting action from the position P to the position R).

Referring back to FIG. 6, brake operation determining means 86 is configured to determine whether a braking operation is performed, that is, whether a brake operating member is operated by the vehicle operator, to generate a braking force between the drive wheels 34 and the road surface on which the vehicle is running. For example, the brake operating member is a brake peal 42 provided near the operator's seat. The above-described brake operation determining means 86 determines the presence or absence of the braking operation, on the basis of an output signal of a brake pedal switch 44 provided to detect the operation of the brake pedal 42, or on the basis of a pressure of a master cylinder of a braking system which is detected by a braking master cylinder pressure sensor 46 and which corresponds to the amount of operation of the brake pedal 42.

When the brake operation determining means 86 has detected the braking operation, the hybrid control means 84 commands the second electric motor M2 to generate a predetermined regenerative braking force. That is, the hybrid control means 84 commands the second electric motor M2 to produce a predetermined reaction force for generating a regenerative braking force which is added to a braking force produced by a mechanical braking system activated by the braking operation by the vehicle operator. For example, the mechanical braking system includes a disc brake or drum brake provided for each wheel of the vehicle. The generated regenerative braking force increases a deceleration value G (negative acceleration value) of the vehicle. The amount of the regenerative braking force to be generated is determined on the basis of the amount of operation of the brake operating member in the form of the brake pedal 42, for example, and according to a predetermined relationship between the amount of the regenerative braking force and the amount of operation of the brake pedal 42, which relationship is obtained by experimentation, so as to improve the fuel economy of the engine 8 during braking operation. The hybrid control means 84 applies a regenerative braking command to the second electric motor M2 through the inverter 54, so that the second electric motor M2 generates the determined amount of regenerative braking force.

When the regenerative braking command is applied to the second electric motor M2 during an inertia phase of a shifting action of the automatic transmission portion 20, the step-variable shifting control means 82 increases a sweeping rate in the sweep control of the torque capacity of the coupling element of the automatic transmission portion 20 to be engaged. That is, a determination as to whether the shifting action of the automatic transmission portion 20 is in the inertial phase or not is made on the basis of the input speed $N_{IN}$ and output speed $N_{OUT}$ of the automatic transmission portion 20 (or the vehicle speed V corresponding to the output speed $N_{OUT}$), and according to a predetermined relationship between the inertial phase and the input and output speeds. When it is determined that the shifting action of the automatic transmission portion 20 is in the inertial phase and when an affirmative determination is obtained by the above-described brake operation determining means 86, the step-variable shifting control means 82 increases the sweeping rate in the sweep control of the coupling element to be engaged. In other words, when the regenerative braking command is applied to the second electric motor M2 during the inertia phase of the shifting action of the automatic transmission portion 20, the sweep control of the coupling element to be engaged is implemented so as to reduce the time required for completion of the shifting action, that is, to rapidly complete the shifting action. Preferably, This sweep control is implemented where the shifting action is a coasting shift-down action from a comparatively high gear position to a comparatively low gear position while the accelerator pedal is in the non-operated position. As described above, the shifting actions of the automatic transmission portion 20 are clutch-to-clutch shifting actions under the control of the step-variable shifting control means 82. In this respect, the above-described sweep control by the step-variable shifting control means 82 implements the sweep control to increase the sweeping rate during the clutch-to-clutch shifting action.

Figure 8:
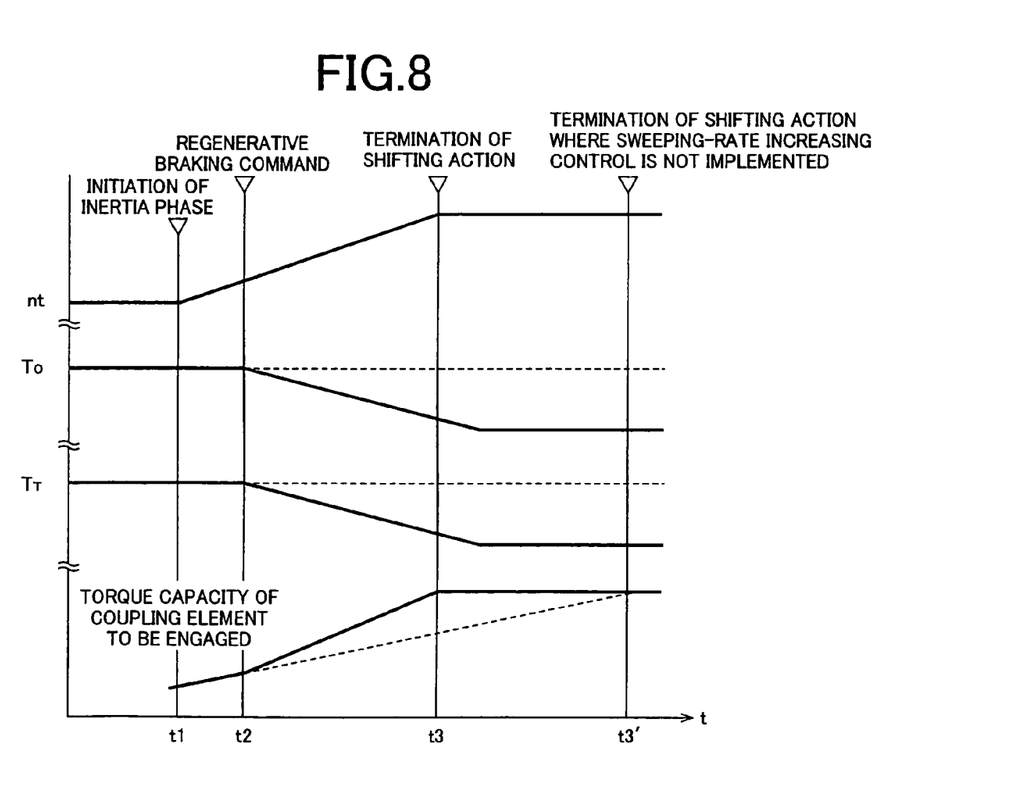
FIG. 8 is a time chart for explaining a sweep control of an engaged coupling device implemented by the electronic control device of FIG. 4, so as to increase a sweeping rate during a braking operation.

FIG. 8 is the time chart for explaining the sweep control of the engaged coupling device implemented by the step-variable shifting control means 82 so as to increase the sweeping rate during the braking operation. In the example of FIG. 8, a coasting shift-down action from a comparatively high gear position (e.g., $4^{th}$ gear position) to a comparatively low gear position (e.g., $3^{rd}$ gear position) is performed while the accelerator pedal is in the non-operated position high-gear position, and the sweep control of the coupling element (e.g., second clutch C2) to be released to perform the coasting shift-down action, and the sweep control of the coupling element (e.g., first brake B1) to be engaged to perform the coasting shift-down action are implemented.

When the inertia phase of the coasting shift-down action is initiated at a point of time t1 indicated in FIG. 8, the turbine speed nt corresponding to the operating speed $N_E$ of the engine 8 begins to rise. At the same time, the sweep control of the torque capacity of the coupling element to be engaged is initiated to increase the torque capacity at a predetermined rate, preferably, at a rate represented by a linear function, as indicated in FIG. 8, by controlling the engaging hydraulic pressure of the coupling element in question (by controlling the command value to be applied to the solenoid valve SL for generating the engaging hydraulic pressure). When the brake operating member in the form of the brake pedal 42 is operated by the vehicle operator, the regenerative braking command is generated at a point of time t2 to command the second electric motor M2 to generate the regenerative braking force which is predetermined on the basis of the amount of operation of the brake pedal 42. In the present embodiment, the sweeping rate at which the torque capacity of the coupling element to be engaged to perform the coasting shift-down action is increased is increased at the moment of generation of the regenerative braking command. Namely, the sweeping rate of the coupling element in the process of engagement is made higher than that prior to the moment of generation of the regenerative braking command, as indicated in FIG. 8. Broken line indicated in FIG. 8 represents the sweeping rate where the sweeping-rate increasing control is not implemented according to the present embodiment. As indicated by the broken line, the engaging action of the coupling element to be engaged is completed at a point of time t3', and the shifting action is terminated, where the sweeping-rate increasing control is not implemented. In this case, the input speed $T_T$ and output speed $T_O$ of the automatic transmission portion 20 are held substantially constant, as also indicated by broken lines in FIG. 8. Where the sweeping-rate increasing control is implemented according to the present embodiment, on the other hand, the engaging action of the coupling element to be engaged is completed and the shifting action is terminated at a point of time t3 prior to the above-indicated point of time t3' at which the engaging action is completed where the sweeping-rate increasing control is not implemented, as indicated by solid lines. Where the sweeping-rate increasing control is implemented, the input speed $T_T$ and output speed $T_O$ of the automatic transmission portion 20 are reduced as a result of the engaging action of the coupling element, as also indicated by solid lines in FIG. 8. As a result of the reduction of the output speed $T_O$, the regenerative braking force generated by the second electric motor M2 provides a predetermined deceleration value G (negative acceleration value) of the vehicle, as in the case of generation of a generative braking force in the absence of a shifting action of the automatic transmission portion 20. Thus, the vehicle is decelerated at the same deceleration value in the presence and absence of the shifting action.

An output torque To of the automatic transmission portion 20 during the sweep control of the coupling element to be engaged is represented by the following equation (1) wherein $T_T$ and $T_C$ respectively represent an input torque of the automatic transmission portion 20 and the torque capacity of the coupling element to be engaged, while A and B represent constants respectively determined by the inertia and gear ratio. As is apparent from the equation (1), an amount of increase of the sweeping rate in the sweep control is determined on the basis of the input torque $T_T$ of the automatic transmission portion 20 and according to a predetermined relationship between the amount of increase of the sweeping rate and the input torque $T_T$. Preferably, the amount of increase of the sweeping rate in the sweep control is determined such that the deceleration value of the vehicle corresponding to the amount of operation of the brake operating member in the form of the brake pedal 42 (or the corresponding master cylinder pressure) during the shifting action of the automatic transmission portion 20 is equivalent to the vehicle deceleration value corresponding to the amount of operation of the brake operating member (or the corresponding master cylinder pressure) while the automatic transmission portion 20 is not in the shifting action.

$$T_O = AT_C + BT_T \tag{1}$$

Figure 9:
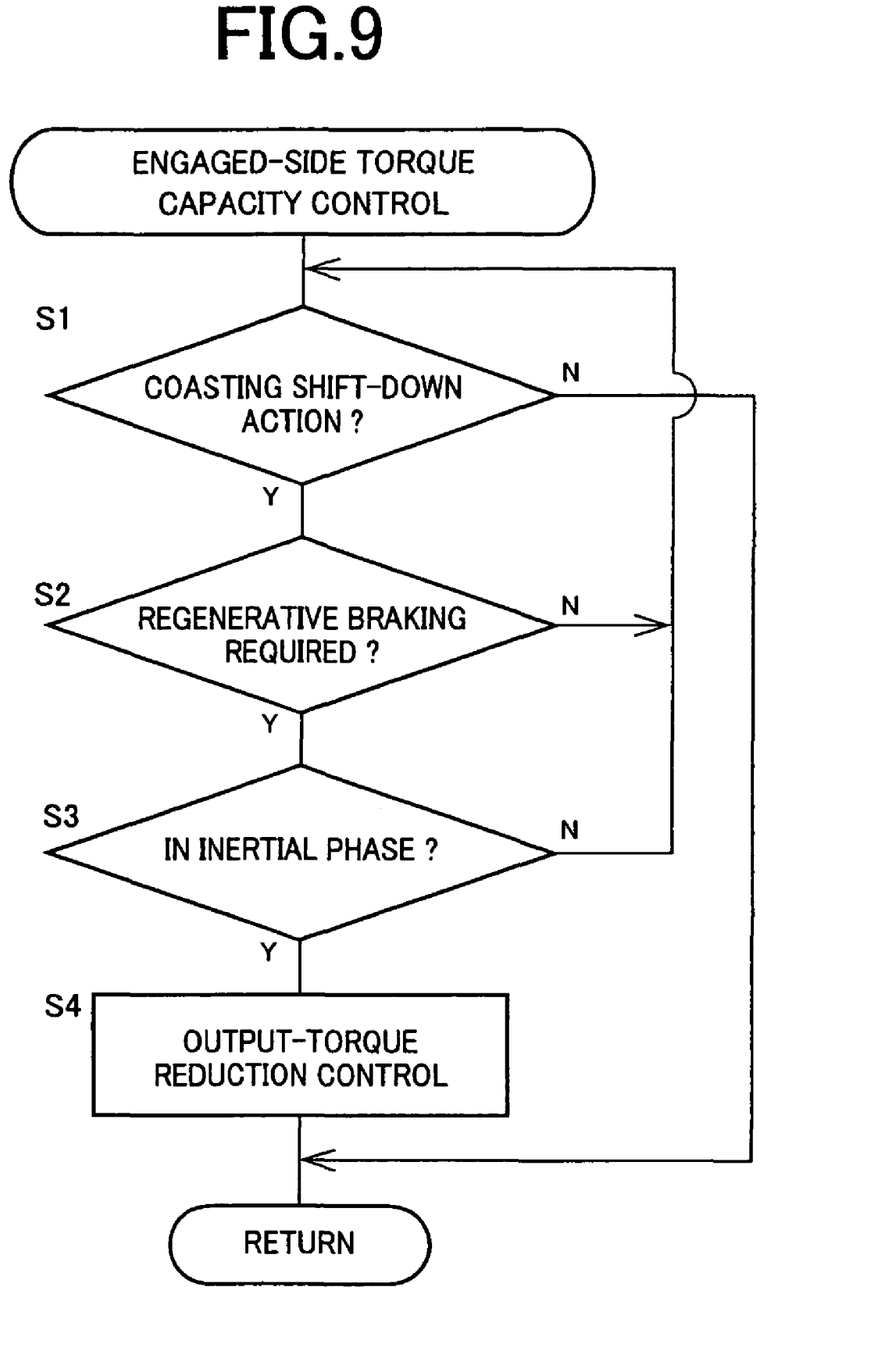
FIG. 9 is a flow chart illustrating major steps implemented by the electronic control device of FIG. 4 to control the torque capacity of the engaged coupling device.

FIG. 9 is a flow chart illustrating major steps implemented by the above-described electronic control device 40 to control the torque capacity of the coupling device to be engaged. The illustrated steps are repeatedly implemented with a predetermined cycle time.

Initially, step S1 (hereinafter "step" being omitted) is implemented to determine whether the coasting shift-down action from the comparatively high gear position to the comparatively low gear position is performed while the accelerator pedal is in the non-operated state. If a negative determination is obtained in S1, the present routine is terminated. If an affirmative determination is obtained in S1, the control flow goes to S2 corresponding to the brake operation determining means 86, to determine whether the regenerative braking command is applied to the second electric motor M2 as a result of an operation of the brake operating member in the form of the brake pedal 42. If a negative determination is obtained in S2, the control flow goes back to S1. If an affirmative determination is obtained in S2, the control flow goes to S3 to make a determination as to whether the shifting action of the automatic transmission portion 20 is in the inertial phase or not, on the basis of the input speed and output speed of the automatic transmission portion 20, and according to the predetermined relationship between the inertial phase and the input and output speeds. If a negative determination is obtained in S3, the control flow goes back to S1 and the following steps. If an affirmative determination is obtained in S3, the control flow goes to S4 corresponding to the step-variable shifting control means 82, to implement an output torque reduction control in which the sweeping rate of the torque capacity of the coupling device to be engaged is increased. Then, the present routine is terminated.

The vehicle including the automatic transmission for which the control apparatus is provided according to the present embodiment has the automatic transmission portion 20 constituting a part of the power transmitting path between the engine 8 and the drive wheels 34, and the second electric motor M2 operatively connected to the third rotary element RE3 of the automatic transmission portion 20. The control apparatus is configured to generate the regenerative braking command commanding the second electric motor M2 to generate the predetermined regenerative braking force when the brake operating member is operated, and to implement the sweep control of the torque capacity of the coupling element of the automatic transmission portion 20 when the coupling element is engaged to perform a shifting action of the automatic transmission portion 20. The control apparatus is further configured to increase the sweeping rate in the sweep control of the torque capacity of the coupling element of the automatic transmission portion 20 to be engaged to perform the shifting action, when the regenerative braking command is generated during the inertia phase of the shifting action, so that the coupling element is rapidly engaged for the purpose of generating an engine braking force when the regenerative braking command is generated according to the operation of the brake operating member during the inertia phase of the shifting action. Accordingly, the braking force generated during the shifting action is equal to the braking force generated in the normal state (in the absence of the shifting action). Namely, the present control apparatus for the vehicular automatic transmission permits effective reduction of deterioration of the vehicle drivability upon operation of the brake operating member.

The present embodiment is further arranged such that the amount of increase of the sweeping rate in the sweep control is determined such that the deceleration value of the vehicle corresponding to an amount of operation of the brake operating member during the shifting action of the automatic transmission portion 20 is equivalent to the deceleration value of the vehicle corresponding to the amount of operation of the brake operating member while the automatic transmission portion 20 is not in the shifting action. Accordingly, the braking force generated as a result of the operation of the brake operating member during the shifting action is equal to that generated while the automatic transmission portion 20 is not in the shifting action.

The present embodiment is further arranged such that the amount of increase of the sweeping rate in the sweep control is determined on the basis of the input torque $T_T$ of the automatic transmission portion 20 and according to the predetermined relationship between the amount of increase and the input torque $T_T$. Accordingly, the deterioration of the vehicle drivability during the operation of the brake operating member can be effectively reduced.

The present embodiment is further arranged such that the sweeping rate is increased in the sweep control during the clutch-to-clutch shifting action of the automatic transmission portion 20, which is performed by the concurrent releasing and engaging actions of the respective two coupling devices of the automatic transmission portion 20. In this case, the deterioration of the vehicle drivability upon operation of the brake operating member can be suitably reduced during the clutch-to-clutch shifting action in which the output torque of the transmission portion tends to be reduced.

The present embodiment is further arranged such that the sweeping rate is increased in the sweep control during the coasting shift-down action of the automatic transmission portion 20 from a comparatively high gear position to a comparatively low gear position while the accelerator pedal is placed in the non-operated position. Accordingly, the deterioration of the vehicle drivability upon operation of the brake operating member can be suitably reduced during the coasting shift-down action in which the vehicle drivability tends to be deteriorated.

While the preferred embodiment of this invention has been described in detail by reference to the accompanying drawings, it is to be understood that the present invention may be otherwise embodied.

In the illustrated embodiment, the second electric motor M2 is operatively connected to the third rotary element RE3 which is the input rotary element of the automatic transmission 20. However, this arrangement is not essential, and the second electric motor M2 may be operatively connected to any rotary element of the automatic transmission 20. That is, the second electric motor M2 may be disposed at any position in the power transmitting path between the engine 8 and the drive wheels 34.

In the illustrated embodiment, the hybrid control means 84 is configured to control the second electric motor M2 so as to generate a regenerative braking force upon a braking operation by the vehicle operator. However, the hybrid control means 84 may be configured to control the first electric motor so as to generate a regenerative braking force. Further alternatively, the hybrid control means 84 may be configured to control both of the first electric motor M1 and the second electric motor M2 to generate the regenerative braking forces.

It is to be understood that the present invention may be embodied with various other non-illustrated changes, which may occur without departing from the spirit of the invention.

The invention claimed is:

1. A control apparatus for an automatic transmission of a vehicle having a transmission portion constituting a part of a power transmitting path between an engine and a drive wheel, and an electric motor operatively connected to an element of the transmission portion, the control apparatus being configured to generate a regenerative braking command commanding said electric motor to generate a predetermined regenerative braking force when a brake operating member is operated, and to implement a sweep control of a torque capacity of a coupling element of said transmission portion when the coupling element is engaged to perform a shifting action of the transmission portion, said control apparatus comprising:

shifting control means for increasing a sweeping rate at which the torque capacity of the coupling element of said transmission portion to be engaged to perform the shifting action is increased in said sweep control when said regenerative braking command is generated during an inertia phase of said shifting action.

2. The control apparatus according to claim 1, wherein said shifting control means includes step-variable shifting control means for determining an amount of increase of the sweeping rate in said sweep control such that a deceleration value of the vehicle corresponding to an amount of operation of the brake operating member during the shifting action of the transmission portion is equivalent to a deceleration value of the vehicle corresponding to the amount of operation of the brake operating member while the transmission portion is not in said shifting action.

3. The control apparatus according to claim 1, wherein said shifting control means includes step-variable shifting control means for determining an amount of increase of the sweeping rate in said sweep control is on the basis of an input torque of said transmission portion and according to a predetermined relationship between said amount of increase and said input torque.

4. The control apparatus according to claim 1, wherein said shifting control means increases the sweeping rate in said sweep control during a clutch-to-clutch shifting action of said transmission portion, which is performed by a releasing action of another coupling device of the transmission portion and an engaging action of said coupling device to be engaged.

5. The control apparatus according to claim 1, wherein said shifting control means increases the sweeping rate in said sweep control during a coasting shift-down action of said transmission portion from a comparatively high gear position to a comparatively low gear position while an accelerator pedal is placed in a non-operated position.

* * * * *